United States Patent
Chou

(10) Patent No.: US 6,406,832 B1
(45) Date of Patent: Jun. 18, 2002

(54) METHOD FOR FABRICATING RIBS OF A PLASMA DISPLAY PANEL

(75) Inventor: Chung-Wang Chou, Chung-Li (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 09/542,843

(22) Filed: Apr. 4, 2000

(30) Foreign Application Priority Data

Feb. 18, 2000 (TW) ........................................ 89102747 A

(51) Int. Cl.⁷ ................................................. C08J 7/18
(52) U.S. Cl. ............................... 430/287.1; 430/286.1; 430/313; 430/315; 430/319; 156/247; 156/272.2; 264/402; 264/496; 427/510; 427/511
(58) Field of Search .......................... 156/89.11, 89.12, 156/247, 272.2; 264/402, 496; 430/313, 315, 319, 287.1, 286.1; 427/510, 511

(56) References Cited

U.S. PATENT DOCUMENTS

| 3,767,490 A | * | 10/1973 | Alberts ........................ 156/2 |
| 4,119,480 A | * | 10/1978 | Nishi et al. .................. 427/96 |
| 4,711,835 A | * | 12/1987 | Dutour ........................ 430/314 |
| 5,209,688 A | * | 5/1993 | Nishigaki et al. ............. 445/24 |
| 5,814,267 A | * | 9/1998 | Sakai et al. .................. 264/496 |
| 6,043,604 A | * | 3/2000 | Horiuchi et al. ............. 313/582 |

OTHER PUBLICATIONS

Derwent Acc No. 1981–88476, Oct. 1981.*

* cited by examiner

Primary Examiner—James Derrington
(74) Attorney, Agent, or Firm—Winston Hsu

(57) ABSTRACT

A method for fabricating a rib on a glass substrate includes steps of printing a first paste layer on the glass substrate, printing a second paste layer onto a first predetermined area of the first paste layer and the second paste layer having a hardener, activating the hardener of the second paste layer to harden the second paste layer, performing a stripping process to remove a portion of the first paste layer uncovered by the hardened second paste layer, and sintering the remaining first paste layer and the second paste layer to form the ribs. The first paste layer is formed by a solid printing process and the second paste layer is formed by a screen printing process. The second paste layer is a rib material having a photo-active hardener, such as polyvinyl cinnamate. The hardener of the second paste layer is activated by an exposure process. Finally, the hardener is removed from the second paste layer in the sintering process and the first paste layer is fused to the second paste layer. and the ribs are formed.

12 Claims, 7 Drawing Sheets

METHOD FOR FABRICATING RIBS OF A PLASMA DISPLAY PANEL

BACKGROUND OF THE INVENTION

1. Field of the Invention

The present invention relates to a method for fabricating ribs of a plasma display panel (PDP). More particularly, the present invention provides a simplified process for fabricating the ribs of a PDP.

2. Description of the Prior Art

Plasma display panels (PDP) are flat panel displays that use a discharge gas to create glowing images on a screen. The PDP has many beneficial characteristics, such as thin, lightweight design, large display sizes and a wide viewing angle.

The PDP has ribs that serve to isolate individual discharge cells from each other, both electrically and optically. The ribs also provide support between the front and rear plates of the PDP. Currently, the fabrication of the ribs of a PDP is the most difficult part of the PDP fabrication process. Hence, improving the rib fabrication process is an important issue in the PDP industry.

Please refer to FIG. 1 to FIG. 4. FIG. 1 to FIG. 4 are cross sectional diagrams of a prior process for fabricating ribs 12 using a sandblasting method. The prior art PDP (not shown) comprises a transparent plate (not shown) and a glass substrate 10 that is positioned behind the transparent plate. In the sandblasting method shown in FIG. 1, solid print of a glass paste is used two or three times to form a glass paste layer 14 onto the glass substrate 10. Next, a dry film photoresist 16 is layered onto the glass paste layer 14.

An exposure process is performed to define the pattern of the ribs 12. The exposure process uses ultraviolet (UV) radiation 20 and a photo-mask 18 to selectively irradiate portions of the photoresist 16. The irradiated portions of the dry film photoresist 16 are hardened and thus transmit the pattern of the photo-mask 18 onto the dry film photoresist 16. As shown in FIG. 2, a development process is carried out to remove the dry film photoresist 16 that hasn't been exposed to the UV radiation 20. The exposed dry film photoresist 16 remains on the glass paste layer 14 and defines the pattern of the ribs 12.

As shown in FIG. 3, after the development process, a sandblasting process is performed. The exposed dry film photoresist 16 protects the glass paste layer 14 below it. A portion of the glass paste layer 14 not covered by the dry film photoresist 16 is removed by the sandblasting process. Then, as shown in FIG. 4, a stripping process removes the remaining dry film photoresist 16, and a firing process is then performed. The glass substrate 10 is heated to 550° C., which fuses the remaining glass paste layer 14, for forming the ribs 12.

The sandblasting method according to the prior art manufactures ribs 12 with narrow width and even height, but some constraints are imposed by using the dry film photoresist 16. In the sandblasting process, sand is sent at high speed towards the glass substrate 10, the dry film photoresist 16 must adhere tightly to the glass paste layer 14. However, the dry film photoresist 16 may peel from the top of the glass paste layer 14 under the friction of the sand blasting process when the adhesion of the dry film photoresist 16 is poor. Moreover, the dry film photoresist 16 needs to be removed completely by a suitable machine after the sandblasting step. Therefore, the dry film photoresist 16 should be stripped from the glass paste layer 14 easily. Hence, adhesion characteristics of the dry film photoresist 16 to the glass paste layer 14 should be considered carefully. In summary, characteristics of the dry film photoresist includes strong adhesion to the glass paste, high resistance against sand blasting, and easy removal after the sandblasting process. However, this complicates the manufacturing process, giving rise to higher costs.

Please refer to FIG. 5 and FIG. 6. FIG. 5 and FIG. 6 are schematic diagrams of a prior process for fabricating the ribs 12 of a PDP using a screen printing method. As shown in FIG. 5, the screen printing method uses a scraper 22 to print a glass paste 13 through a screen 24 onto a predetermined area of the glass substrate 10.

As shown in FIG. 6, the screen printing steps are repeated six to twelve times to form the glass paste 13 over the glass substrate 10. The glass paste 13 is stacked until the thickness reaches a predetermined thickness, such as 150 $\mu$m to 200 $\mu$m. Finally, a firing process is employed to heat the glass substrate 10 until the temperature rises to between 50° C. and 600° C. Under such high temperatures, the stacked glass paste 13 fuses to form the ribs 12.

In the screen printing method, a dry film photoresist is not used and less glass paste is consumed. However, the screen printing method has poor precision control, and this is a disadvantage in the fabrication of high-resolution PDPs. It is very difficult to control with precision a multi-layer printing process, and so the screen printing method is unable to form ribs with a narrow width. The resolution of the PDP cannot, therefore, be further enhanced. Moreover, the complexity of the manufacturing process is proportional to the number of times that the printing process is performed. The multi-layer printing process increases manufacturing time, and also forms ribs 12 with a non-uniform thickness.

SUMMARY OF THE INVENTION

Therefore, a primary objective of the present invention is to provide a method for fabricating ribs of a plasma display panel to solve the above mentioned problems which use the sandblasting method or the screen printing method.

According to the present invention, a method for fabricating ribs of a plasma display panel (PDP) is provided. The PDP comprises a glass substrate. In the method, a solid printing process is first performed to form a first paste layer on the glass substrate. Next, a screen printing process prints a second paste layer onto a first predetermined area of the first paste layer. The second paste layer includes the same rib materials as the first paste layer and a photo-active hardener, such as polyvinyl cinnamate. An exposure process is then employed to activate the photo-active hardener, and causing the second paste layer to be harden. Then, a sandblasting process removes those portions of the first paste layer that are not covered by the second paste layer, the hardened second paste layer acting as a hard mask. Finally, a heating process removes the hardener from the second paste layer and fuses the first paste layer to the second paste layer to form a plurality of ribs.

There is no dry film photoresist used in the aforementioned process, and the printing process is performed only a few times. Thus, the present method simplifies a more complicated process and reduces production time and costs.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
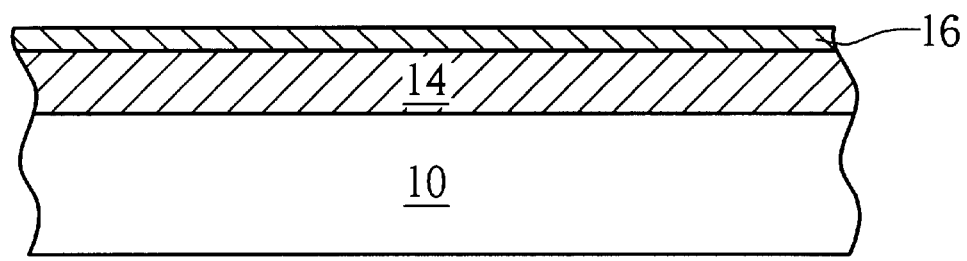
FIGS. 1 to 4 are cross-sectional diagrams of a prior art process for fabricating ribs of a PDP using a sandblasting method.
Figure 2:
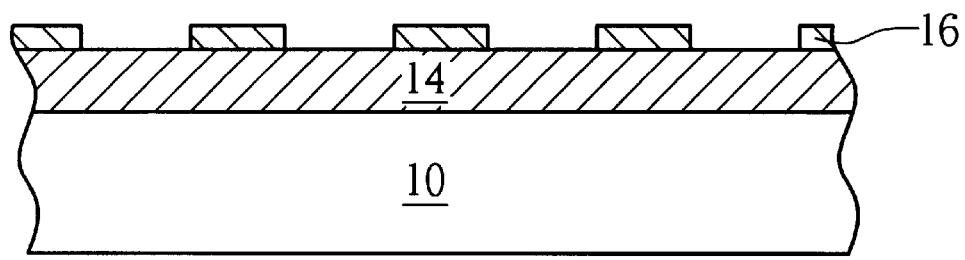
Figure 3:
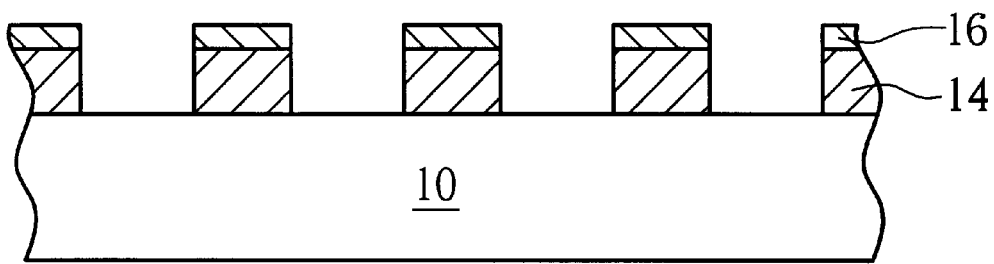
Figure 4:
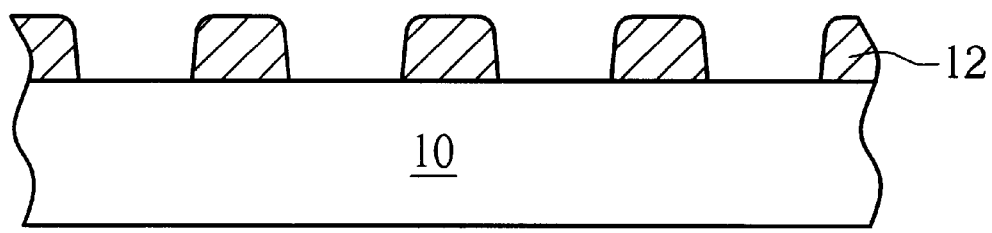
Figure 5:
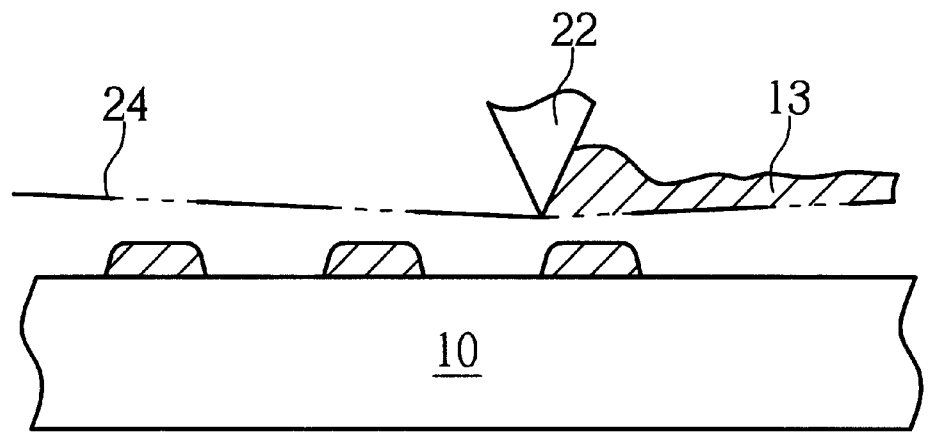
FIGS. 5 to 6 are cross-sectional diagrams of a prior art process for fabricating the ribs of a PDP using a screen printing method.
Figure 6:
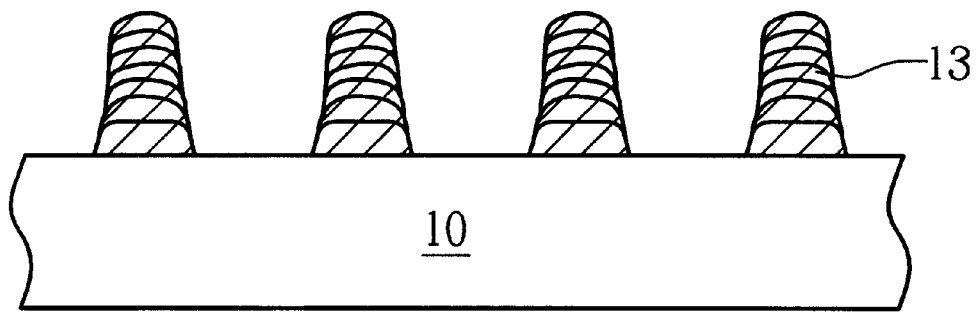
Figure 7:
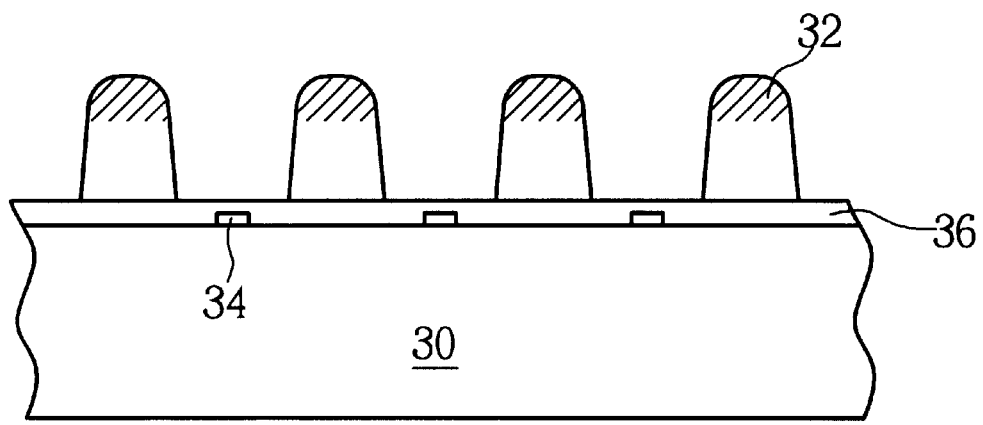
FIG. 7 is a cross-sectional diagram of ribs of a PDP according to the present invention.

Please refer to FIG. 7 which is a cross-sectional diagram of ribs 32 of a PDP according to the present invention. The invention PDP (not shown) comprises a transparent plate (not shown) and a glass substrate 30 behind the transparent plate. As shown in FIG. 7, the method of the present invention fabricates a plurality of ribs 32 on the glass substrate 30. The surface of the glass substrate 30 has a plurality of electrodes 34, which are used to excite the discharge cells of the PDP. An overcoat dielectric layer 36 covers both the glass substrate 30 and the electrodes 34 and protects the electrodes 34.

Figure 8:
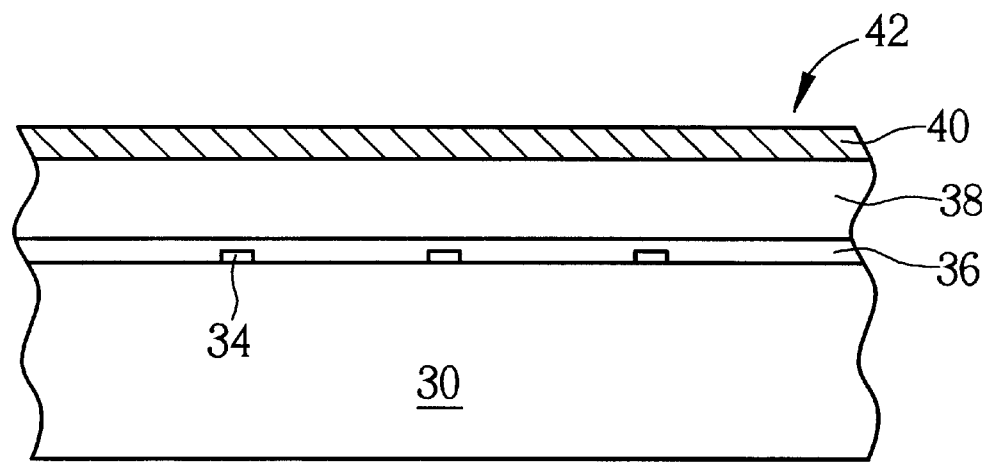
FIGS. 8 to 11 are cross-sectional diagrams of the present invention process for fabricating the ribs shown in FIG. 7.

Please refer to FIG. 8 to FIG. 11. FIG. 8 to FIG. 11 are cross-sectional diagrams of the present invention process for fabricating the ribs 32 shown in FIG. 7. As shown in FIG. 8, a solid printing process is first performed to print a paste layer 42 onto the overcoat dielectric layer 36, i.e. the overcoat dielectric layer 36 is completely covered by the paste layer 42. The paste layer 42 includes a white paste layer 38 and a black paste layer 40. The white paste 38 is printed three to six times and the black paste 40 is printed once or twice. The paste layer 42 is formed after the total thickness of the white paste layer 38 and the black paste layer 40 equals to a predetermined thickness.

Figure 9:
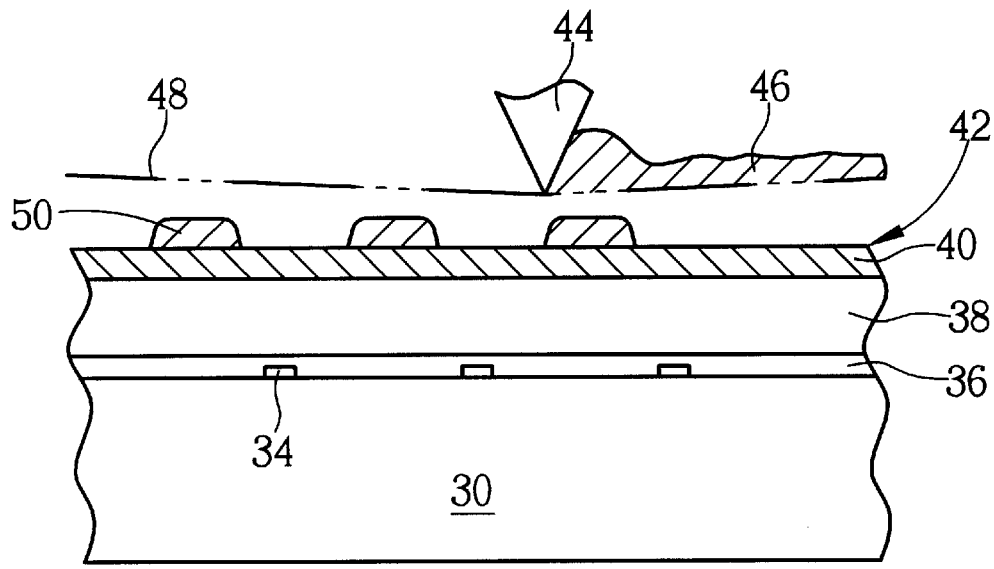

As shown in FIG. 9, a second printing process, usually a screen printing process, is employed after the solid printing process. In the screen printing process, a scraper 44 is used to print a black paste 46 through a screen 48 onto a first predetermined area of the paste layer 42, and thus a plurality of paste layers 50 are formed. Each paste layer 50 includes a glass powder, a photo-active hardener, a binder, and a solvent. In the present invention, the photo-active hardener is polyvinyl cinnamate, the binder includes ethyl cellulose and polyvinyl alcohol (PVA), and the solvent includes terpineol and butyl carbital acetate. The paste layer 50 comprises the similar materials that are used for the paste layer 42 and additional photo-active materials that are harden the paste layer 50.

Figure 10:
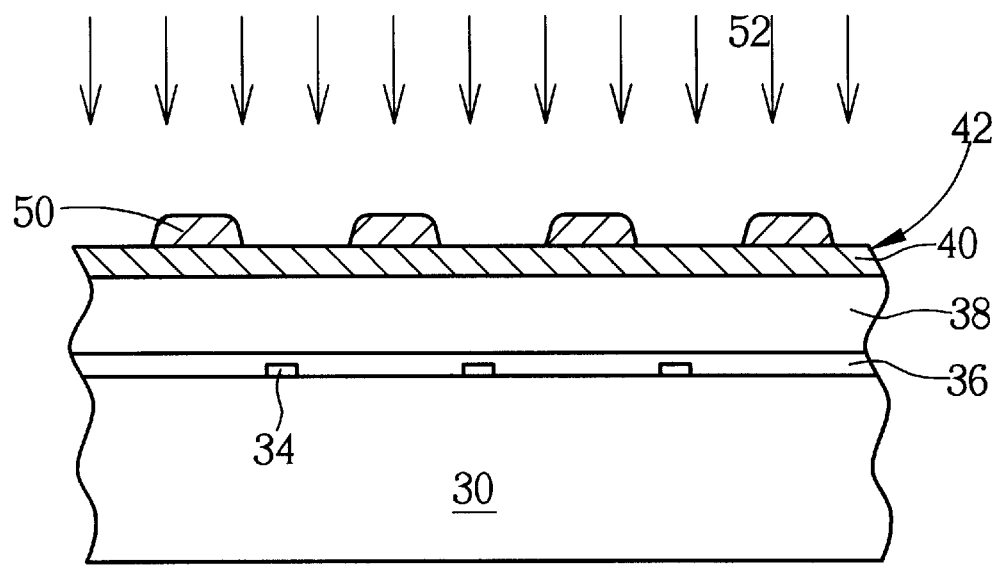
Figure 11:
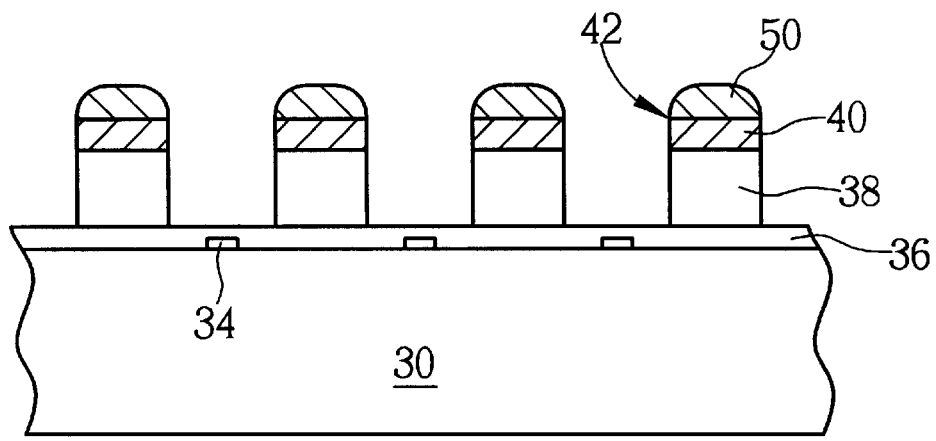

As shown in FIG. 10, the paste layer 50 is exposed under ultraviolet radiation in an exposure process after the screen printing process. The photo-active hardener of the paste layer 50 is activated, and the paste layer 50 is then hardened to form a mask pattern for the ribs 32 shown in FIG. 7. In FIG. 11, after the exposure process, a sandblasting process is used to remove those portions of the paste layer 42 that are not covered by the hardened paste layer 50. Because the hardened paste layer 50 is able to withstand the sandblasting, it is not necessary to use a dry film photoresist. As a result, the present invention avoids the drawbacks of a dry film photoresist.

Finally, a sintering process is employed to heat the glass substrate 30 at the temperature ranged from 500° C. to 600° C. The paste layer 50 is fused to the paste layer 42 and a plurality of ribs 32 shown in FIG. 7 are formed after the sintering process. The photo-active hardener is a kind of polymer decomposed under high temperatures, and therefore, the heating process also removes the photo-active hardener from the paste layer 50. The bottom layer of the completed ribs 32 is made of the white paste 38 for reflecting light which is produced by the phosphor of the discharge cells. The upper layer of the completed ribs 32 is made of the black pastes 40, 46 for enhancing the contrast ratio of the discharge cells.

Because the black paste 46 also comprises the similar rib materials, the solid printing process of the black paste layer 40 can be skipped. This can simplify the fabrication process. In this case, the screen process simply prints the black paste 46, which comprises the photo-active hardener, directly onto the white paste layer 38.

Figure 12:
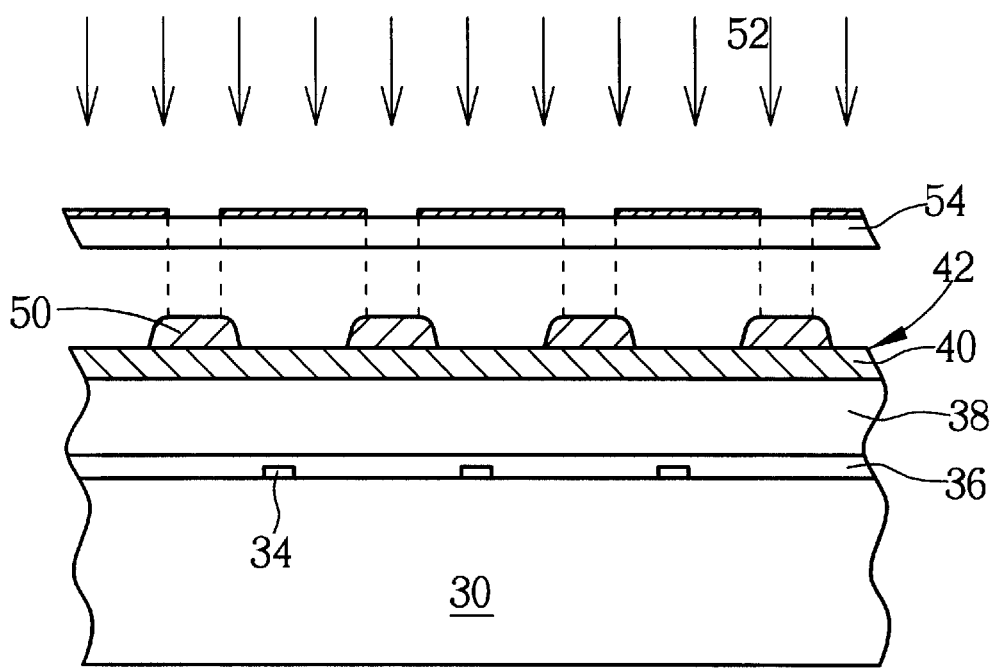
FIGS. 12 to 13 are cross-sectional diagrams of a second process for fabricating narrower ribs according to the present invention.
Figure 13:
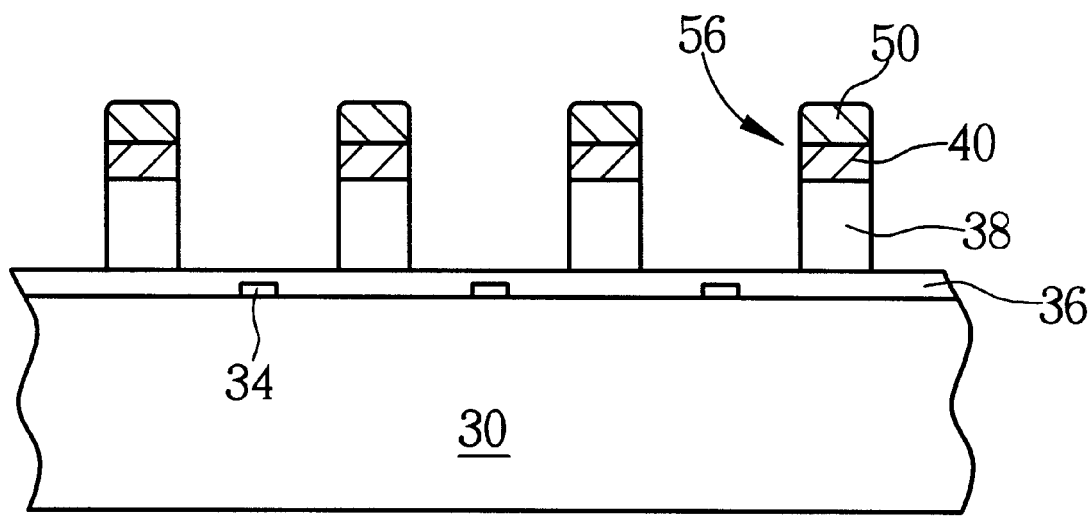

Please refer to FIG. 12 and FIG. 13 that are cross-sectional diagrams of a second process for fabricating ribs 56 in the present invention. If a rib having a narrower width is needed, a photo-mask 54 should be interposed between the UV radiation source and the glass substrate 30 during the exposure process. The photo-mask 54 can precisely define the exposure area of the paste layer 50. Thus, only a second predetermined area of the paste layer 50 is exposed and hardened. The dimension of the second predetermined area is smaller than that of the first predetermined area, so that a plurality of ribs 56 with a narrower width are formed after the sandblasting process, as shown in FIG. 13.

The present invention employs a screen printing process to print the black paste 46 that comprises the photo-active hardener onto the paste layer 42. This forms another paste layer 50. An exposure process is used to harden the paste layer 50, and a sandblasting process and a sintering process are used to define the ribs 32. No development process or photoresist stripping process is. used in the invention method, and a photo-mask is selectively employed depending upon the demanded width of the ribs. Thus, the present method is a simplified process, and both production time and cost can be reduced. Moreover, in the present method, a rib material with a hardener, rather than a dry film photoresist, is served as a hard mask. For example, the black paste 46 has similar materials as the paste layer 42, and the black paste 46 can be adhered tightly to the glass paste layer 42. Hence, the black paste 46 will not peels from the paste layer 42 during the sandblasting process in the present invention.

In contrast to the conventional sandblasting method, a dry film photoresist is not used in the method of the present invention, so the fabrication process is simplified and cost can be reduced. In addition, a hardened paste layer having the similar rib materials is used as a photomask for defining the pattern of the ribs. Therefore, the adhesion between the upper paste layer of the rib and the bottom paste layer of the rib is enhanced. Thus, the peeling problem of the dry film photoresist 16 is eliminated in the invention method. Furthermore, the number of the printing process is reduced in the present invention, so the process for manufacturing ribs can be simplified and cost can be reduced. Because only one screen printing process is employed in this invention, ribs having uneven heights and poor precision of multi-layer printing can be eliminated. Subsequently, ribs with a narrower width and uniform height can be fabricated according to the present invention using a photo-mask.

Those skilled in. the art will readily observe that numerous modifications and alterations of the device may be made while retaining the teachings of the invention. Accordingly, the above disclosure should be construed as limited only by the metes and bounds of the appended claims.

What is claimed is:

1. A method for fabricating ribs on a glass substrate, the method comprising steps of:
   printing a first paste layer on the glass substrate;
   printing a second paste layer onto a first predetermined area of the first paste layer, the second paste layer comprising a hardener and a glass powder;
   activating the hardener of the second paste layer to harden the second paste layer;
   using the hardened second paste layer as a mask to pattern the first paste layer and performing a stripping process to remove a portion of the first paste layer uncovered by the hardened second paste layer; and
   sintering the remaining first paste layer and the second paste layer to form the ribs so that the hardener of the second paste layer is removed and the glass powder of the second paste layer remains.

2. The method of claim 1 wherein the hardener is a photo-active hardener.

3. The method of claim 2 wherein the photo-active hardener comprises polyvinyl cinnamate.

4. The method of claim 1 wherein an exposure process is used to activate the hardener of the second paste layer.

5. The method of claim 4 wherein the exposure process employs ultraviolet radiation to irradiate the second paste layer.

6. The method of claim 5 wherein the exposure process uses a photo-mask to expose a second predetermined area within the second paste layer, the dimension of the second predetermined area being smaller than the dimension of the first predetermined area.

7. The method of claim 1 wherein the second paste layer further comprises a binder and a solvent.

8. The method of claim 7 wherein the binder comprises ethyl cellulose,and polyvinyl alcohol (PVA).

9. The method of claim 7 wherein the solvent comprises terpineol and butyl carbital acetate.

10. The method of claim 1 wherein the stripping process is a sand blasting process.

11. The method of claim 1 wherein a solid printing process is used to print the first paste layer on the glass substrate.

12. The method of claim 1 wherein a screen printing process is used to print the second paste layer onto the first predetermined area of the first paste layer.

* * * * *